United States Patent [19]
Crabtree

[11] 4,052,808
[45] Oct. 11, 1977

[54] COLLAPSIBLE FISH SPEAR

[76] Inventor: Philip G. Crabtree, 5820 16th NE., Seattle, Wash. 98105

[21] Appl. No.: 720,899

[22] Filed: Sept. 7, 1976

[51] Int. Cl.² ............................................. A01K 81/04
[52] U.S. Cl. ............................................. 43/6; 294/61
[58] Field of Search .............. 43/6, 5, 18 R; 294/61, 294/19 R

[56] References Cited

U.S. PATENT DOCUMENTS

| | | | |
|---|---|---|---|
| 1,755,646 | 4/1930 | Halstead | 294/61 X |
| 3,004,362 | 10/1961 | Day | 43/6 |
| 3,036,398 | 5/1962 | Gagner | 43/18 R |
| 3,245,169 | 4/1966 | Kennel | 43/18 R |
| 3,486,265 | 12/1969 | Cheesebrew | 43/6 |
| 3,932,953 | 1/1976 | Sharp | 43/6 |

FOREIGN PATENT DOCUMENTS

| | | | |
|---|---|---|---|
| 411,731 | 6/1945 | Italy | 43/6 |
| 564,355 | 6/1957 | Italy | 43/6 |

Primary Examiner—Louis G. Mancene
Assistant Examiner—Daniel J. Leach
Attorney, Agent, or Firm—Seed, Berry, Vernon & Baynham

[57] ABSTRACT

A collapsible fish spear is disclosed for use in underwater sports fishing. The spear includes a number of lengths of hollow rod which are telescopically interlocked together to form a single rod. The forward length of rod includes a removable projecting spear unit for spearing fish. The lengths are connected together by an elastic band which is secured at one end to the forward length and at the opposite end to the terminal length of rod, the band tensioned to hold the lengths in interlocked relation. To collapse the spear the lengths are pulled apart and positioned in parallel side-by-side relation. An elastic loop is secured at its respective ends to the terminal length of rod. Tensioning of the elastic loop and release thereof by the holder of the spear propels the spear through the water to spear a fish.

4 Claims, 4 Drawing Figures

COLLAPSIBLE FISH SPEAR

BACKGROUND OF THE INVENTION

1. Field of the Invention

This invention relates to a collapsible fish spear and method of using such.

2. Prior Art Relating to the Disclosure

Underwear sports fishing requires that the sports fisherman carry a full length spear for spearing fish. Carrying of a full length spear is awkward and cumbersome. Some means has been needed to allow the underwater fisherman to carry a compact, collapsible spear which, with ease, can be assembled into a full-length spear for use in a matter of seconds.

SUMMARY OF THE INVENTION

It is an object of this invention to provide a collapsible fish spear for use in underwater sports fishing which comprises a number of lengths of interlocking, hollow rods joined together by an elastic band which is tensioned to hold each of the lengths of rods in interlocked relation, the spear collapsed by pulling each length apart from the adjacent length and folding the rods together.

It is a further object of this invention to provide a collapsible fish spear which includes an elastic loop secured to the terminal end of rod for propelling the spear through the water to spear a fish.

It is a further object of this invention to provide a method of spearing fish underwater using a collapsible fish spear of the type described.

These and other objects are accomplished by providing a collapsible fish spear which comprises: (1) a series of lengths of hollow rod adapted to telescopically interlock together into a single length of rod, the lengths including a forward length with a fixed or removable spear, a terminal length and one or more intermediate lengths, (3) elastic means secured at one end to the forward length of rod and at the opposite end to the terminal length or rod, the elastic means extending under tension through the intermediate lengths of rod, and (4) an elastic loop secured at both end to the terminal length of rod for propelling the spear through the water when tensioned by the holder and released.

DESCRIPTION OF THE PREFERRED EMBODIMENTS

Figure 2:
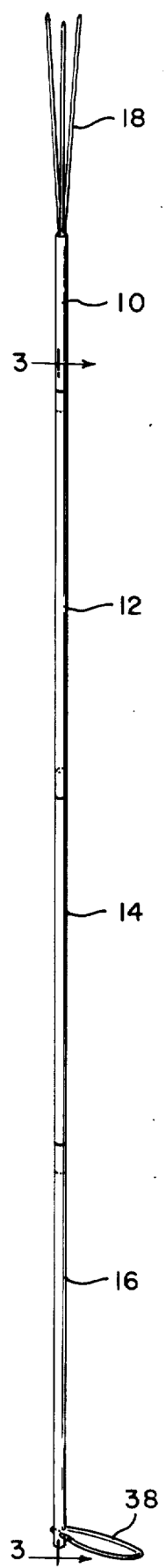
FIG. 2 is a perspective view of the fish spear ready for use.
Figure 1:
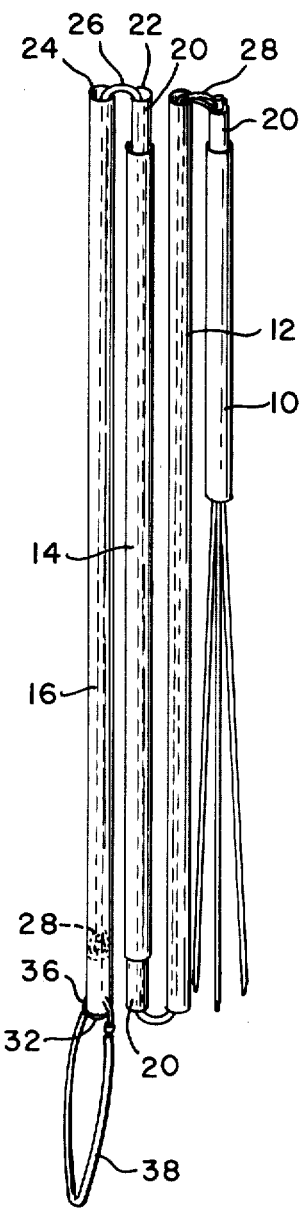
FIG. 1 is a perspective view of the fish spear in the collapsed state.
Figure 4:
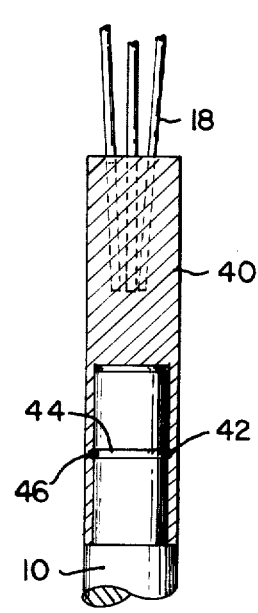
FIG. 4 is a cross sectional view illustrating one means of attaching the spear head unit for removal and replacement.

Referring to FIG. 2 the fish spear comprises a series of lengths of hollow rod which are telescopically interlocked together to form a single linear unit. The forward length 10 may be solid if desired and includes a projecting spear unit 18 extending therefrom. If desired, the spear unit may be removable as illustrated in FIG. 4 so that it can be interchanged with other spear units for spearing of different types of fish. The intermediate lengths of rod 12 and 14 are telescopically interlocked with each other and with the forward and terminal lengths 10 and 16, respectively. The ends 20 of the lengths of rod 10 and 14 are formed with an outer diameter slightly less than the inner diameter of the remaining constant diameter portion of the rod. This allows the lengths of rod to telescopically interlock with the adjacent rod as illustrated. Preferably the terminal ends 22 and 24 of the smaller and larger diameter portions of the rods are rounded so that the rods will easily telescope together.

Figure 3:
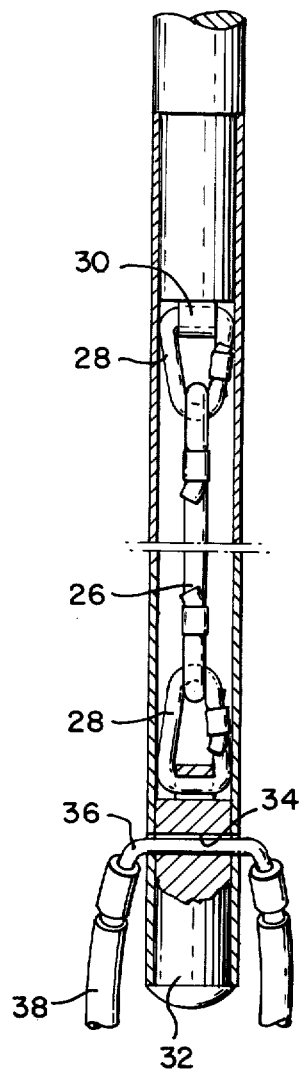
FIG. 3 is a view illustrating the manner in which the elastic band is secured to the hollow lengths of rod at each end.

An elastic band 26 is secured to the forward length of rod 10 at one end and to the terminal length of rod 16 at the other end, the elastic band extending through the hollow interior of the intermediate lengths of rod 12 and 14. The elastic band may be secured to the rods in any suitable manner. One means of securing the band is illustrated by FIG. 3 wherein the elastic band 26 is secured to pieces of cord 28 extending through eyelets 30 held in the end of the forward rod 10 opposite the spear unit 18 by fittings 32. A hole 34 is drilled in rod 16 near the terminating end thereby and a piece of cord 36 extended therethrough for securing closed elastic band 38 thereto. The closed, elastic loop 38 is used to propel the spear through the water. To propel the spear the loop is placed over the wrist, the spear is grasped, the loop tensioned and then released.

FIG. 4 illustrates one means of securing removable spear units to the tip rod 10. The tip rod 10 is provided with a section of lesser diameter and a groove 44 formed therein. A matching groove 42 is formed in unit 40 from which the spear lines 18 project. An expansion ring 44 secures unit 40 to the tip of the rod 10.

The collapsible fish spear an be carried underwater in collapsed condition with the user either grasping it so that it will not unfold or using a clasp to hold the spear in collapsed condition. When it is desired to expand the spear the clasp is removed or the grip of the user relaxed. The tension in the elastic band 26 causes the sections of rod to unfold and interconnect with one another into a spear of 5 to 6 feet as illustrated in FIG. 2 in a matter of seconds.

The spear unit is easy to transport underwater in the collapsed state, is compact, lightweight and can easily be expanded for use with one hand.

The embodiments of the invention in which a particular property or privilege is claimed are defined as follows:

1. A collapsible fish spear for use in underwater sports fishing comprising:
   a series of lengths of rod adapted to telescopically interlock together in end-to-end relation into a single length of rod, including a forward length having a spear unit extending therefrom, a terminal length and one or more intermediate lengths;
   elastic means secured at one end to the forward length, at the other end to the terminal length and, extending under tension through the intermediate lengths; and
   an elastic loop secured to the spear for propelling the spear through water when tensioned by the holder and released, the spear transportable in collapsed condition with the lengths of rod pulled apart and held substantially parallel to each other, the lengths of rod, when released, joining together in end-to-end relation to form a single length of rod due to the tension exerted thereon by the elastic means.

2. The collapsible fish spear of claim 1, wherein the forward rod is solid and wherein the spear unit is removable.

3. The collapsible fish spear of claim 1, wherein the terminal ends of each of the rods are rounded so that the rods will easily telescope together.

4. A method of spearing fish underwater using a collapsible fish spear comprising:

providing a fish spear having a series of lengths of rod adapted to telescopically interlock together in end-to-end relation to form a single length of rod including a forward length of rod with a spear unit, a terminal length of rod and one or more intermediate lengths of rod, elastic means secured at one end to the forward length of rod and at the other end to the terminal length of rod and extending through the intermediate lengths or rod, the elastic means holding the lengths of rod securely together in end-to-end relation and causing the lengths of rod to join together in end-to-end relation when not secured together, elastic loop means secured to the terminal length of rod for propelling the fish spear through the water in its uncollapsed state when tensioned by the holder and released, carrying the spear underwater in collapsed condition, releasing the spear to allow the spear to expand and the lengths of rod to telescopically interlock together into end-to-end relation, and cocking the spear by tensioning the elastic loop relative to the length of rod, and releasing the rod, the spear propelled through the water toward the fish by the tension in the elastic loop.

* * * * *